UNITED STATES PATENT OFFICE.

WILLIAM MORRISON, OF CHICAGO, ILLINOIS.

NEGATIVE PLATE FOR STORAGE BATTERIES.

1,284,425.  Specification of Letters Patent.  Patented Nov. 12, 1918.

No Drawing.  Application filed February 19, 1918.  Serial No. 218,126.

*To all whom it may concern:*

Be it known that I, WILLIAM MORRISON, a citizen of the United States, residing at Chicago, in the county of Cook and State of Illinois, have invented certain new and useful Improvements in Negative Plates for Storage Batteries, of which the following is a specification.

My invention relates to a new method of manufacturing negative plates for storage batteries. As is well known, negative plates are made by pasting into the interstices of an antimony-lead grid, active material such as litharge mixed with sulfuric acid.

Pasted plates, as thus usually made, have however the disadvantage that the metallic spongy lead formed by reduction of the active material is not always in good electrical contact with the supporting grid, such lack of contact increasing the resistance of the battery.

The object of this invention is to obviate this disadvantage, and I attain this object by first subjecting the grids to a sand-blast whereby the surfaces of the grid are roughened. The plates are then pasted and may be formed in the usual way, in a sulfuric acid electrolyte, the resulting spongy lead being reduced in intimate contact with the roughened surface of the grid. Greater conductivity is thereby produced because of the intimate contact between the roughened grid and the reduced spongy lead.

Instead of using a sulfuric acid electrolyte in the forming process, I prefer to reduce the lead oxid of the filled grid in a magnesium sulfate solution, as this permits the reduction of the oxid without allowing the oxids to first become sulfated, as is the case when sulfuric acid is used. By this preferred method a more even reduction of the lead oxid all over the surface of the plate is obtained, whereby an undue liberation of hydrogen between the grid and the active material is avoided so that the intimate contact between the reduced lead and the pitted support is maintained.

I thus obtain a plate in which a more complete bond is effected between the active material and the plate and because of the greater surfaces in contact and the more thorough adhesion of active material to the plate, greater conductivity results.

I claim:

1. The method of manufacturing negative storage battery plates which consists in sand-blasting the grid, filling the grid with lead oxid, and then electrolytically reducing said oxid to spongy lead, whereby the reduced lead is maintained in intimate conductive contact with the roughened grid.

2. The method of manufacturing negative storage battery plates which consists in sand-blasting the grid, filling the grid with lead oxid, and then electrolytically reducing said oxid to spongy lead in a solution of magnesium sulfate, whereby the reduced lead is maintained in intimate contact with the roughened grid.

3. A negative plate for storage batteries consisting of a sand-blasted grid having spongy lead in intimate electrical conductive contact with the roughened surface of said grid.

4. A negative plate for storage batteries as claimed in claim 3 produced by the process claimed in claim 2.

In testimony whereof I affix my signature.

WILLIAM MORRISON.